United States Patent [19]

Beattie et al.

[11] Patent Number: 5,430,265
[45] Date of Patent: Jul. 4, 1995

[54] TWIN SIGNAL SWITCH ASSEMBLY INCLUDING IMPROVED HANDLE LASH REDUCTION FEATURES

[75] Inventors: Glen H. Beattie, Livonia; H. Dean Geyer, Flint, both of Mich.

[73] Assignee: United Technologies Automotive, Inc., Dearborn, Mich.

[21] Appl. No.: 196,419

[22] Filed: Feb. 15, 1994

[51] Int. Cl.$^6$ .......................... H01H 3/16; H01H 9/00
[52] U.S. Cl. ............................. 200/61.54; 200/61.27
[58] Field of Search ....................... 200/11 R-11 TW, 200/14, 17 R-18, 61.27-61.38, 61.54-61.57

[56] References Cited

U.S. PATENT DOCUMENTS

| | | | |
|---|---|---|---|
| 3,914,566 | 10/1975 | Wendling | 200/61.27 |
| 4,387,279 | 6/1983 | Brevick | 200/61.54 |
| 4,426,951 | 1/1984 | Nishizima | 116/46 |
| 4,723,057 | 2/1988 | Lane, Jr. | 200/61.27 |
| 4,739,132 | 4/1988 | Erdelitsch et al. | 200/61.54 |
| 4,840,078 | 6/1989 | Shitanoki | 74/484 R |
| 4,900,946 | 2/1990 | Williams et al. | 307/10.1 |
| 5,107,243 | 4/1992 | Maeda | 338/172 |

*Primary Examiner*—J. R. Scott
*Attorney, Agent, or Firm*—Harness, Dickey & Pierce

[57] ABSTRACT

An improved handle assembly for actuating an automotive turn signal switch, a windshield wiper switch and a wash fluid switch is provided. The handle assembly includes an internal shaft, an outer tubular member and a housing. The housing is supported or the turn signal switch and houses the windshield wiper switch and the wash fluid switch. The internal shaft extends into the housing to engage and actuate either the wiper switch or the wash fluid switch. The outer tubular member is concentrically disposed about the internal shaft, and a portion of the outer tubular member extends into the housing and engages the switch not engaged by the internal shaft. Both the wash fluid switch and the wiper switch can be independently actuated by independently axially rotating the internal shaft or the outer tubular member. The turn signal switch is actuated by pivoting the internal shaft which in turn pivots the housing supported on the turn signal switch. In order to reduce the amount of lash between the internal shaft and the housing, a separate member having a load bearing surface is provided to directly engage the internal shaft.

15 Claims, 1 Drawing Sheet

TWIN SIGNAL SWITCH ASSEMBLY INCLUDING IMPROVED HANDLE LASH REDUCTION FEATURES

BACKGROUND AND SUMMARY OF THE INVENTION

This invention generally relates to handles for turn signal switches and, more particularly, to an improved handle with windshield wiper and wash fluid switches incorporated therein.

Modern day automobile consumers are generally much more sophisticated than in years past, demanding comfort and quality at relatively inexpensive prices. Of late, consumers have been particularly discriminating with regard to technological gadgetry within the vehicle and the convenience with which such gadgetry can be operated. Thus, in an effort to provide "world class" quality operational controls for these various gadgets, automobile manufacturers have strived to produce control devices that are readily accessible and easy to use. Control devices having selectors or switches that are responsive or "crisp", without a considerable degree of play or "lash", are highly desirable. With these types of control devices, the operator can immediately determine whether a proper selection has been made, or a switch has been actuated, by the look and/or feel of the control device itself.

Once such control device is the handle for the turn signal switch. It is common for this handle to be used not only for controlling the turn signal indicators, but also for the windshield wiper controls, the windshield wash fluid control, the beam selector and the "cruise control". As such, the handle for the turn signal switch is literally a control center for a number of features in the vehicle. Accordingly, it would be desirable to provide a handle having distinct control switches and selectors that can be easily and precisely manipulated to control the aforementioned features. As is known, existing handles for turn signal switches quite typically have some inherent degree of lash. In other words, the turn signal switch handle can be pivoted considerably in either direction before the turn signal switch is actuated. For example, when the vehicle operator wishes to engage the right-hand turn signal indicator, and the operator grasps and raises the handle in order to actuate the turn signal switch, the handle can typically be raised a considerable amount before the switch is in fact actuated.

Lash is generally attributable to the inner end of the handle being coupled to the turn signal switch by a number of interconnected components. These components generally have clearances between one another for ease of assembly. However, when such clearances are provided, the handle must be moved a significant amount in order to compress the clearances such that the components engage one another and actuate the turn signal switch. Thus, one method for overcoming a large amount of lash would be to minimize the clearances between these interconnected parts, thereby eliminating the amount of slop between them. In order to reduce the clearances between these interconnected components, the geometric tolerance bands for the components would also have to be reduced. This would obviously cause considerable increase in the cost of manufacturing these components, particularly when these components have complex geometric shapes. Thus, it would be desirable to provide a simplified member that more directly couples the handle to the turn signal switch.

The present invention introduces a load bearing surface for supporting the handle through direct engagement with an independent, yet simplified member. By providing this separate member for supporting the handle, further advantage is gained. The tolerances of the interconnected components can be relaxed since a tight clearance fit of these components is no longer critical to the support of the handle. As a result, these components can be more cost efficiently manufactured and assembled without sacrificing the integrity with which the handle is supported. Accordingly, the handle of the present invention has been adapted to provide these advantageous and desirable features.

Additional benefits and advantages of the present invention will become apparent to those skilled in the art to which this invention relates from the subsequent description of the preferred embodiments and appended claims, taken in conjunction with the accompanying drawings.

DETAILED DESCRIPTION OF THE DRAWINGS

DETAILED DESCRIPTION OF THE PREFERRED EMBODIMENT

Figure 1:
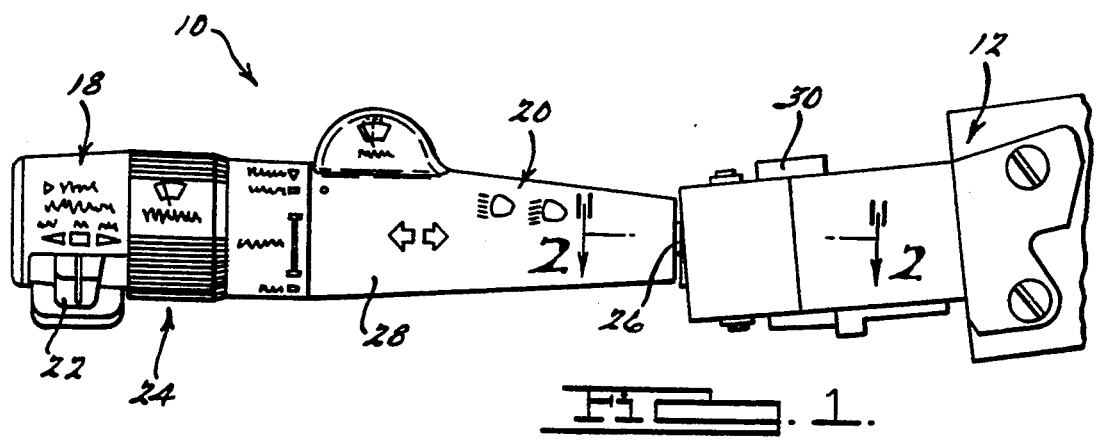
FIG. 1 is a side elevational view, broken away, of a preferred embodiment of the improved handle of the present invention which controls the turn signal switch, the windshield wiper control switch, the wash fluid switch, the beam selector and the cruise control.
Figure 2:
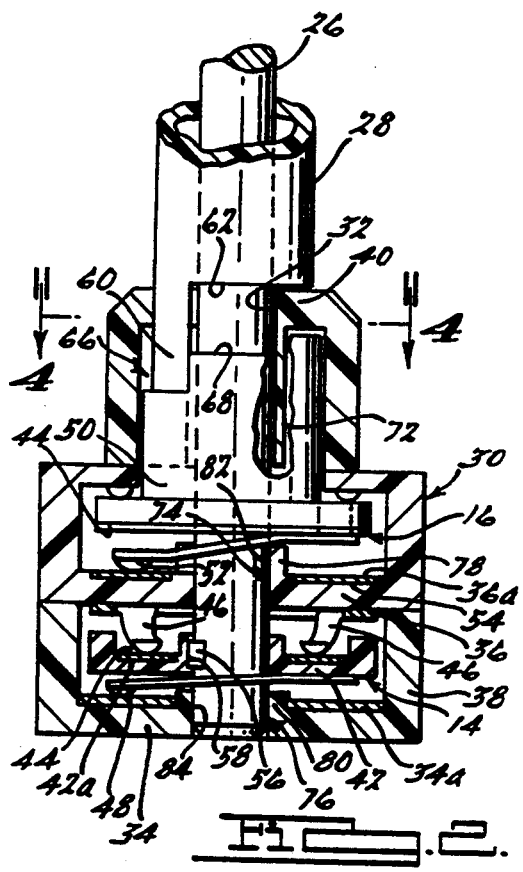
FIG. 2 is a partial longitudinal sectional view taken through section 2—2 in FIG. 1 illustrating the switches therein and the shaft being supported by bearing surfaces provided on the housing in accordance with the principles of the present invention.

Referring now to the drawings, and in particular to FIGS. 1 and 2, an improved handle assembly 10 for actuating an automotive turn signal switch 12 is shown in accordance with a preferred embodiment of the present invention. The handle assembly 10 is used not only to control a turn signal switch 12, but is also used to actuate a windshield wiper control switch 14 and a wash fluid switch 16, along with a cruise control 18 and a beam selector 20. The cruise control 18 is conventionally operated by a slide actuated selector 22 near an outer end 24 of the handle assemble. In order for an operator to select the desired frequency for the windshield wipers (not shown), the outer end 24 of the handle assembly 10 is axially rotated, which in turn rotates an internal shaft 26 coupled to the wiper control switch 14. The wash fluid switch 16, on the other hand, is operated by axially rotating an inner tubular end 28 of the handle assembly 10, thereby energizing the wash fluid pump (not shown). In order to change the headlights (not shown) from a high beam "bright" mode to a low beam "dim" mode, or vice versa, the entire handle assembly 10 is simply pivoted rearwardly toward the operator of the vehicle and released in a conventional manner. Lastly, in order to actuate the turn signal switch 12, the handle 10 is pivoted which, in turn, pivots a housing 30 that is supported by the turn signal switch 12 in a conventional manner. The handle assembly 10 is pivoted upwardly (clockwise in the drawing of FIG. 1) to engage the right-hand turn indicator (not shown) and downwardly (counter-clockwise in FIG. 1) to engage the left-hand turn indicator (not shown). As is known, such pivoting of prior art handles quite typically involves a degree of lash which permits the handle to be pivoted considerably before the turn signal switch is in fact actuated. This lash is caused by loads and moments which are inherently exerted upon the wash fluid switch, the internal shaft and the housing during pivoting of the handle.

As is known, the inner tubular ends of prior art handles are adapted to be directly inserted into the wash fluid switch. Therefore, it has not been possible to provide the outboard end of prior art housings with a load bearing support surface that directly engaged the shaft. This type of configuration was heretofore disadvantageous since a support would interfere with the inner tubular end of the handle. As a result, when prior art handles are pivoted, any loads caused by the internal shaft at the outboard end of the housing are fully exerted upon the wash fluid switch. Clearances provided between the wash fluid switch, the housing and the shaft were compressed by these loads during initial pivoting of prior art handles. Thus, a great deal of lash was experienced during pivoting of prior art handles before the turn signal switch was actuated. The present invention provides a unique housing 30 having a specially adapted load bearing support surface 32 which eliminates this lash and isolates the wash fluid switch 14 from loads exerted by handle assembly 10 during pivoting.

As best shown in FIG. 2, both the windshield wiper control switch 14 and the wash fluid switch 16 are rotatably disposed within the housing 30. The wiper control switch 14 is housed between an inner annular member 34 and an intermediate annular member 36 which both extend radially inwardly from an exterior wall 38 of the housing 30. The wash fluid switch 16 is housed between the intermediate annular member 36 and an outer annular member 40 that also extends radially inwardly from the exterior wall 38 of the housing 30. As further shown in FIG. 2, the wiper control switch 14 includes a body portion 42 having a surface 44 with conductive and non-conductive circuit traces (not shown) formed on a printed circuit assembly 42a fixedly secured thereon. A pair of conductive wipers 46 project from the intermediate annular member 36 and engage these conductive and nonconductive areas. In addition, an electrically conductive wiper 48 projects from the wiper control switch body 42 and engages conductive and non-conductive portions of circuit traces (not shown) formed on a printed circuit assembly 34a fixedly secured the inner annular member 34. Similarly, the wash fluid control switch 16 includes a body 50 with electrically conductive wipers 52 (only one being visible in FIG. 2) that extend to engage conductive and non-conductive circuit traces (not shown) formed on a printed circuit assembly 36a fixedly secured to the upper surface 54 of the intermediate annular member 36. Accordingly, as the bodies 42 and 50 of the switches 14 and 16 are independently rotated, the electrically conductive wipers 46, 48 and 52 conventionally engage and disengage respective electrically conductive surfaces. As such, the electrical contact necessary to energize various circuits (not shown) used to control operation of the windshield wiper and the wash fluid pump is conventionally provided.

Figure 3:
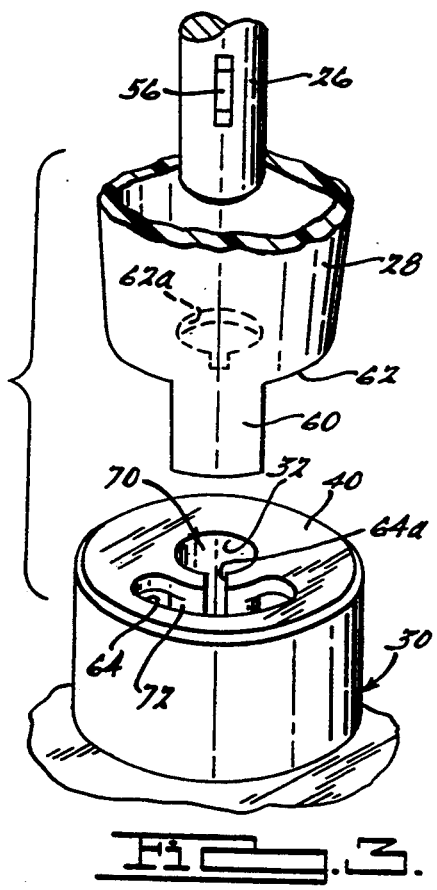
FIG. 3 is an exploded perspective view, broken away, of a portion of the handle illustrating the internal shaft that extends into the housing and engages the wiper control switch and further illustrating the inner tubular end of the handle that has a key which extends into the housing and engages the wash fluid switch in accordance with the principles of the present invention.
Figures 4, 5:
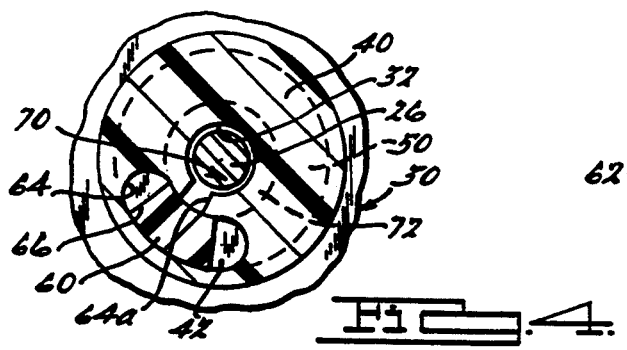
FIG. 4 is a cross sectional view taken through section 4—4 in FIG. 2 illustrating the outer end of the housing of the present invention.
FIG. 5 is an end view of the tubular wash handle of the present invention.

As shown in FIGS. 2-5, the wiper control switch 14 is rotatably actuated by manually rotating the internal shaft 26. An operator simply grasps and rotates the outer end 24 of the handle assembly 10, which is fixed to a portion of the internal shaft 26 that axially extends from the housing 30. The internal shaft 26 has a radially extending key 56 which is inserted through a key-shaped opening 62a in an inboard end 62 of the inner tubular portion 28 to a corresponding key-way 58 (FIG. 2) in the wiper control switch body 42. Accordingly, when the outer end 24 of the turn signal handle 10 is axially rotated, the shaft 26 and the wiper control switch body 42 are correspondingly rotated. The wash fluid control switch 16, on the other hand, is rotatably actuated by the inner tubular member 28 of the handle assembly 10. This tubular member 28 is concentrically disposed about a portion of the internal shaft 26 at the inner end of the handle assembly 10. As shown in FIGS. 3 and 5, this tubular member 28 has an axially projecting key 60 that extends from an inboard end 62 of the tubular member 28. This key 60 passes through a generally curved slot 64 in the outer annular member 40 of the housing 30 and engages a corresponding key-way 66 in the outboard end 68 of an wash fluid switch body 50 A slot 64a is also provided for allowing the key 56 to pass through the outer annular member 40 or the housing 30. Thus, when the tubular member 28 is grasped by the operator and axially rotated, engagement between the key 60 and the key-way 66 causes the wash fluid switch body 50 to correspondingly rotate.

In order to actuate the turn signal switch 12 or the beam selector 20, the handle assembly 10 is pivoted rather than rotated. Pivoting of the outer end 24 of the handle assembly 10 causes the internal shaft 26 to exert a load on the housing 30 which, in turn, actuates either the turn signal switch 12 or the beam selector 20. As best shown in FIGS. 2 and 3, the outer annular member 40 has an opening 70 therethrough which provides a generally cylindrical bearing surface 32 for supporting the internal shaft 26. In addition, an annulus 72 integrally extends from the outer annular member 40, axially toward the wash fluid switch body 50. This annulus 72 provides the opening 70 with additional bearing surface for the shaft 26. Accordingly, when the handle assembly 10 is pivoted to operate the beam selector 20 or the turn signal switch 12, the shaft 26 directly engages the bearing surface 32 provided at the outer annular member 40 of the housing 30. Note, the inner and intermediate annular members 34 and 36 also have openings 74 and 76 and corresponding annuluses 78 and 80 which provide generally cylindrical bearing surfaces 82 and 84 for supporting the internal shaft 26. Also note that although these annular members 34 and 36 and bearing surfaces 82 and 84 were provided on prior art handles, since the wash fluid switch body was outboard of the intermediate annular member, lash still existed in these prior art handles.

By providing a separate member—the outer annular member 40—which has a bearing surface 32 that is outboard from the wash fluid switch body 50, loads are prevented from being exerted upon the wash fluid switch body 50. Accordingly, the clearances between the switch body 50, the housing 30 and the shaft 26 can be increased and the geometric tolerance bands for each of these parts can be reduced. Moreover, the inboard end 62 of the tubular member 28 and the outboard end 68 of the wash fluid switch body 50 do not have to be specially adapted to mate. Rather, a simple key 60 extends from the inboard end 62 of the tubular member 28 and engages the key-way 66 in the wash fluid switch body 50. As a result of the aforementioned novel modifications, the cost of manufacturing these parts is decreased with looser tolerances, assembly is simplified with larger clearances and lash in the handle assembly 10 is reduced by the added bearing surface 32, thereby providing a "world class" feel to the operation of the handle assembly 10.

What is claimed is:

1. An handle assembly for actuating an automotive turn signal switch, a windshield wiper switch and a wash fluid switch, said handle assembly comprising:
   a) a turn signal switch;
   b) a housing member for housing a wiper switch and a wash fluid switch, said housing member being supportable on a turn signal switch member and having an inner end and an outer end, said outer end having an opening therein which is at least partially defined by a generally cylindrical bearing surface, said inner end of said housing member further having at least one other generally cylindrical bearing surface, said bearing surfaces combining to define an axial passageway within said housing member;
   c) a shaft partially disposed within said passageway such that a portion of said shaft extends from said outer end of said housing member, said cylindrical bearing surfaces engaging a circumferential surface of said shaft to support axial rotation of said shaft within said passageway, said shaft being operably associated with one of said wiper and said wash fluid switches for actuating said one switch; and
   d) a tubular member concentrically disposed about a portion of said shaft extending from said axial passageway, said tubular member being operably associated with the other of said wiper and wash fluid switches for actuating said other switch.

2. The handle assembly of claim 1, wherein both said wiper switch and said wash fluid switch are disposed within said housing member axially between said cylindrical bearing surfaces.

3. The handle assembly of claim 1, wherein at least one of said cylindrical bearing surfaces is provided by a member that extends radially inwardly from an outer wall of the housing member.

4. The handle assembly of claim 3, wherein said radially inwardly extending member has a generally annular member that extends axially inwardly from a radially inner end thereof, said annular member providing an additional bearing surface for said shaft.

5. The handle assembly of claim 1, wherein said wiper switch and said wash fluid switch are concentrically disposed about said shaft.

6. The handle assembly of claim 1, wherein said tubular member concentrically disposed about said shaft has an inner end that is juxtapositioned with said outer end of said housing member.

7. The handle assembly of claim 6, wherein said inner end of said tubular member has a single key that extends axially therefrom and passes through an opening in said outer end of said housing member to engage one of said wiper and wash fluid switches for actuating said one switch.

8. A system for reducing lash in a turn signal handle without narrowing geometric tolerance bands for components within the handle, said handle operable for actuating a turn signal switch, a wiper control switch and a wash fluid switch, said system comprising:
   a) a housing member for housing said wiper control switch and said wash fluid switch, said housing member being supported on a turn signal switch;
   b) a rigid member at least partially disposed within said housing member such that said rigid member extends from one end of said housing member, said rigid member being operable to actuate one of said wiper control and wash fluid switches within said housing member and for operatively engaging said housing member to actuate said turn signal switch; and
   c) a supporting member extending from said one end of said housing member, said supporting member providing a bearing surface for engaging said rigid member such that loads applied to said rigid member to actuate said turn signal switch are isolated from said wiper control switch and said wash fluid switch.

9. The system of claim 8, wherein said rigid member comprises a shaft that axially extends into said housing member.

10. The system of claim 8, wherein said supporting member comprises an annular member that extends radially inwardly from an outer wall of said housing member at said one end of said housing member.

11. The system of claim 8, wherein said bearing surface provided by said supporting member defines an opening therein through which said rigid member passes.

12. The system of claim 8, wherein said wash fluid switch is actuated by a tubular member disposed above a portion of said rigid member.

13. The system of claim 8, wherein said bearing surface of said supporting member is further provided by an annulus that extends from said supporting member and engages said rigid member.

14. The system of claim 8, wherein said wash fluid switch and said wiper control switch are concentrically disposed above said rigid member, and between said turn signal switch and supporting member.

15. The system of claim 8, wherein said bearing surface is generally cylindrical.

* * * * *

UNITED STATES PATENT AND TRADEMARK OFFICE
CERTIFICATE OF CORRECTION

PATENT NO. : 5,430,265
DATED : July 4, 1995
INVENTOR(S) : Glen H. Beattie et al

It is certified that error appears in the above-indentified patent and that said Letters Patent is hereby corrected as shown below:

On the title page: Item[54] and Column 1, line 1
"TWIN" should be --TURN--

Abstract, line 5, "or" should be --on--

Col. 1, line 1, "TWIN" should be --TURN--

Col. 1, line 29, "Once" should be --One--

Col. 2, line 61, "assemble" should be --assembly 10--

Col. 3, line 7, insert --assembly-- after "handle"

Col. 3, line 63, insert --upon-- after "secured"

Col. 4, line 18, insert --engage-- after "portion 28 to"

UNITED STATES PATENT AND TRADEMARK OFFICE
CERTIFICATE OF CORRECTION

PATENT NO. : 5,430.265  
DATED : July 4, 1995  
INVENTOR(S) : Glen H. Beattie, et al It is certified that error appears in the above-indentified patent and that said Letters Patent is hereby corrected as shown below:

Col. 4, line 33, "the" (first occurrence) should be --an--  
                "an" should be --the--  
                insert --.-- after "50"

Col. 4, line 35, "or" should be --of--

Col. 5, line 20, claim 1, "An" should be --A--

Col. 6, line 49, claim 12, "above" should be --about--

Col. 6, line 57, claim 14 "above" should be --about--

Signed and Sealed this

Twenty-first Day of November, 1995

Attest:

BRUCE LEHMAN

*Attesting Officer*      *Commissioner of Patents and Trademarks*